(12) United States Patent
Wang et al.

(10) Patent No.: US 10,379,981 B2
(45) Date of Patent: Aug. 13, 2019

(54) DIAGNOSING DISTRIBUTED VIRTUAL NETWORK MALFUNCTION

(71) Applicant: Nicira, Inc., Palo Alto, CA (US)

(72) Inventors: Yusheng Wang, Beijing (CN); Guofeng Zhu, Beijing (CN); Hua Wang, Beijing (CN); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 133 days.

(21) Appl. No.: 15/455,150

(22) Filed: Mar. 10, 2017

(65) Prior Publication Data
US 2018/0260292 A1    Sep. 13, 2018

(51) Int. Cl.
| | |
|---|---|
| *G06F 11/00* | (2006.01) |
| *G06F 11/22* | (2006.01) |
| *G06F 9/455* | (2018.01) |
| *G06F 11/07* | (2006.01) |
| *H04L 12/931* | (2013.01) |

(52) U.S. Cl.
CPC ...... *G06F 11/2257* (2013.01); *G06F 9/45558* (2013.01); *G06F 11/0766* (2013.01); *G06F 11/221* (2013.01); *H04L 49/70* (2013.01); *G06F 2009/45591* (2013.01); *G06F 2009/45595* (2013.01)

(58) Field of Classification Search
CPC .................. G06F 11/0766; G06F 11/2257
See application file for complete search history.

(56) References Cited

U.S. PATENT DOCUMENTS

| | | | |
|---|---|---|---|
| 8,774,530 B1 * | 7/2014 | Florissi .............. | G06K 9/6253 |
| | | | 382/224 |
| 9,767,197 B1 | 9/2017 | Agarwal et al. | |
| 10,073,753 B2 * | 9/2018 | Boyapalle .......... | G06F 11/3055 |
| 2005/0240835 A1 | 10/2005 | Dragnea et al. | |

(Continued)

FOREIGN PATENT DOCUMENTS

WO    2007061517 A2    5/2007

OTHER PUBLICATIONS

Tim Nelson, First-Order Models for Configuration Analysis, A thesis Submitted to the Faculty of the Worcester Polytechnic Institute, In partial fulfillment of the requirements for the Degree of Doctor of Philosophy in Computer Science, May 2013.

(Continued)

*Primary Examiner* — Charles Ehne
(74) *Attorney, Agent, or Firm* — SU IP Consulting

(57) ABSTRACT

A method is provided to diagnose one or more malfunctions in a virtual network having a network functionality implemented in a distributed manner by hypervisors, each performing part of the network functionality. The method includes receiving user input of observed facts about the virtual network, where the observed facts include identifiers of virtual components in the virtual network, and adding the observed facts to a knowledge base. The method further includes, in response to the identifiers of the virtual components, querying agents on the hypervisors for collected facts related to the virtual components, receiving and adding the collected facts to the knowledge base, and applying logic rules to the knowledge base to produce one or more diagnoses of the virtual network.

20 Claims, 5 Drawing Sheets

(56) References Cited

U.S. PATENT DOCUMENTS

| | | | |
|---|---|---|---|
| 2014/0359353 A1* | 12/2014 | Chen | G06F 11/1438 714/15 |
| 2015/0363256 A1* | 12/2015 | Kundu | G06F 11/0793 714/47.1 |
| 2016/0078342 A1* | 3/2016 | Tang | H04L 41/00 706/47 |
| 2017/0063651 A1 | 3/2017 | Wang et al. | |
| 2017/0171055 A1 | 6/2017 | Wang et al. | |

OTHER PUBLICATIONS

Xinming Ou, "A Logic-Programming Approach to Network Security Analysis", A dissertation presented to the faculty of Princeton University in candidacy for the degree of Doctor of Philosophy, Recommended for Acceptance by the Department of Computer Science, Nov. 2005.

* cited by examiner

US 10,379,981 B2

DIAGNOSING DISTRIBUTED VIRTUAL NETWORK MALFUNCTION

BACKGROUND

Network virtualization has been widely accepted by industry and it is crucial for enterprise information technology (IT) infrastructure and data center operation. Such systems have been deployed to production sites with thousands of hypervisors and more of such systems are being built. This trend has posed new challenges to developing, testing, and maintaining these systems.

DETAILED DESCRIPTION

Figure 1:
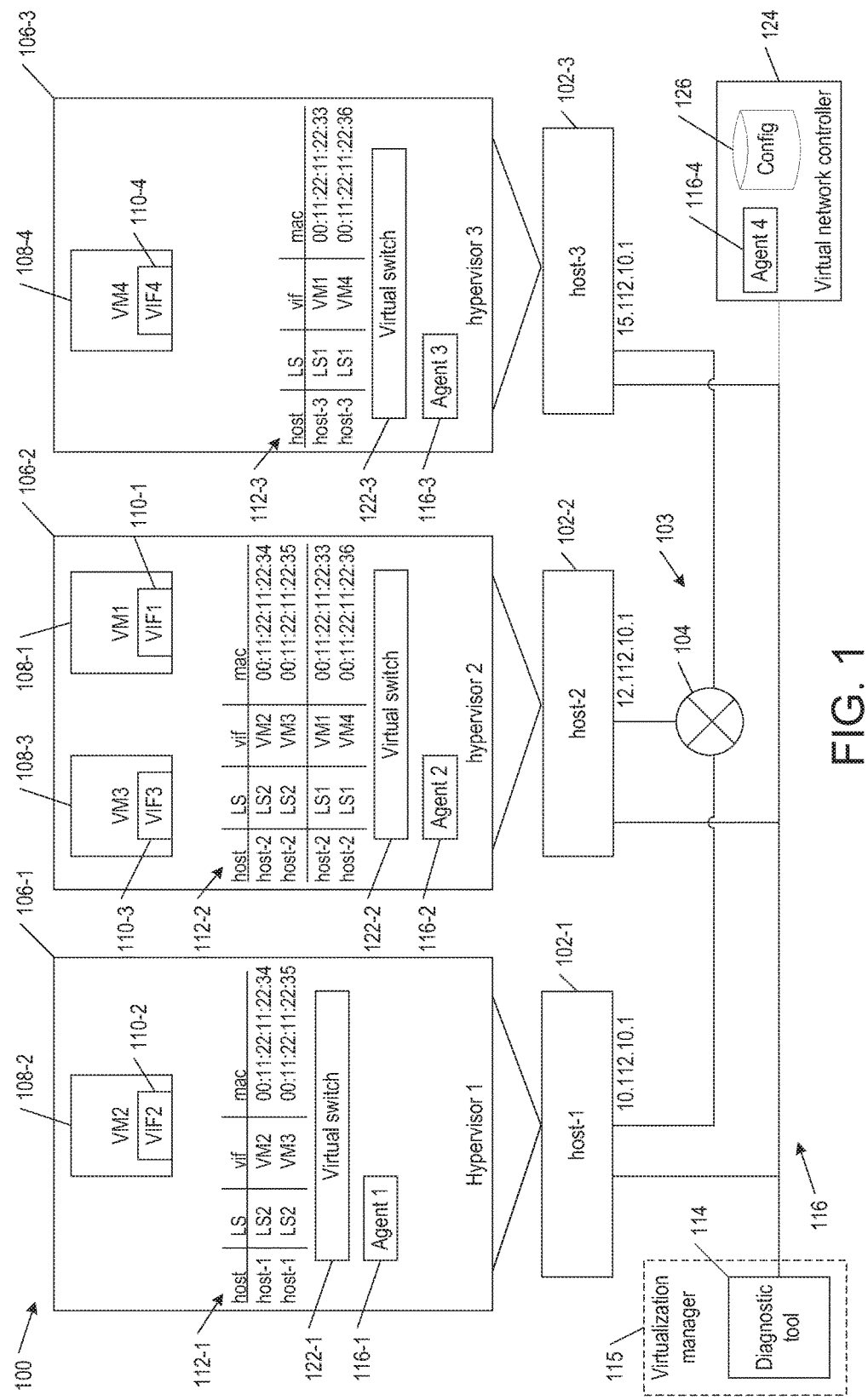
FIG. 1 is a block diagram illustrating a physical view of a virtual machine (VM) system operating normally in some examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Many causes contribute to the unexpected behavior of a virtual network. For example, a user may incorrectly configure the virtual network by accident or from a misunderstanding of the network model provided by the physical system. The virtual network may malfunction due to runtime environment issues, such as a down physical network link between a pair of hypervisors. The virtual network may also malfunction from system defect.

Diagnostic methods for physical network devices usually do not work well for virtual networks. A virtual network is typically built with complex clustering techniques. In these systems, data is scattered in many nodes and each node may only contain a subset of the data. The data at different nodes may even be out-of-sync during certain times.

The way network functionalities are implemented is very different for a virtual network. Take network routers as example, a traditional physical router is a centralized device. When a physical router fails for a network segment, an engineer may log on the router and the most needed information is available on that device. On the contrary, for a logical overlay network, a single router or switch may be implemented in a distributed way and each hypervisor only performs part of the routing functionality. The ping operation to a router gateway may be replied by different physical components depending on where the operation is initiated and to which gateway the operation is directed.

The binding between an operation and a location where the operation is performed may also be dynamic. The distributed nature of the system, together with changed implementation method of network functionalities, contributes to the difficulties in building and diagnosing such system.

In examples presented by the present disclosure, a method and a tool are provided for diagnosing distributed virtual network malfunctions. The diagnostic tool applies logic rules that express the normal behavior of a virtual network to determine malfunctions. Observed facts about the virtual network, such as symptoms of a malfunction, are collected by a user and presented to the diagnostic tool in a unified format. The diagnostic tool uses a logic engine to apply the logic rules on the observed facts to produce new facts. As the logic engine is running, it fetches relevant facts from agents on components implementing the virtual network and produces new facts. When the logic engine does not produce any new fact, the diagnostic tool ends the diagnostic process. The final facts produced by the logic rules reveal potential issues in the virtual network. The potential issues include user input error, configuration error, physical network issue, and system defect. For example, the potential issues may be as precise as lacking a configuration for a virtual network interface (VIF) or a down physical link between hypervisors A and B.

The diagnostic method and tool have the following advantages. The diagnostic tool only collects relevant information from components of a distributed system. This is important as in a large system there may be thousands of hypervisors and it is not practical to examine all system state data. Guided by the logic rules, the diagnostic tool dynamically compute the needed information using facts provided by the user and the current state of the system. The user specifies her observed issues and intent using a unified format, such as rows (tuples) of a table. Such information helps the diagnostic tool use the relevant logic rules and limit the scope of the data searching when applying these logic rules. While the logic rules specify correct behavior of one system, they are generic so they apply to other systems as well.

FIG. 1 is a block diagram illustrating a physical view of a virtual machine (VM) system 100 operating normally in some examples of the present disclosure. VM system 100 includes host computers 102-1, 102-2, and 102-3 (collectively as "hosts 102" or as a generic individual "host 102"). Host 102 includes physical memory, processor, and network interface card (NIC).

Hosts 102 communicate through a network 103, which may be implemented by a switch 104, router, or other similar device. Hosts 102-1, 102-2, and 102-3 run respective hypervisors 106-1, 106-2, and 106-3 (collectively as "hypervisor 106" or as a generic individual "hypervisor 106"). The terms host and hypervisor may be used interchangeably as there is one hypervisor per host. Hypervisors 106 create and run virtual machines (VMs). For example, hypervisor 106-1 runs a VM 108-2, hypervisor 106-2 runs VMs 108-1 and 108-3, and hypervisor 106-3 runs a VM 108-4. VMs 108-1, 108-2, 108-3, and 108-4 (collectively as "VMs 108" or as a generic individual "VM 108") have respective virtual network interfaces (VIFs) 110-1, 110-2, 110-3, and 110-4 (collectively as "VIFs 110" or as a generic individual "VIF 110"). VMs 108 have virtualized memory and processors that execute guest operating systems (OS) and applications.

Virtual machines 108-1, 108-2, 108-3 and 108-4 may reside on logical overlay networks. In certain embodiments, logical overlay networks, also referred to as software defined networks, are implemented by hosts 102 as network abstractions fully decoupled from the underlying physical network infrastructure. Each hypervisor 106 runs a virtual switch 122 (e.g., VMware NSX vSwitch) that is associated with a forwarding table, which may be independently populated with forwarding instructions from a centralized virtual network controller 124 (e.g., VMware NSX Controller cluster). Virtual network controller 120 may be a cluster of virtual appliances running on separate hosts coupled by a network 116 to hosts 102.

Each hypervisor 106 may implement one or more logical networks (logical switches) by receiving packets from a VM running on the hypervisor, consulting the forwarding table to determine that the packet's destination address associated with a destination VM requires that the packet be encapsulated and communicated over physical network 103 to a destination host on which the destination VM resides. On receipt of an encapsulated packet, the destination hosts decapsulates the packet and passes the inner, original packet to the destination VM. Thus, while the source and destination may be configured to operate with specific network settings, such as IP addresses and so forth, physical network 103 may be completely unaware of these addresses, and in fact, VMs connecting to a particular logical switch may be arbitrarily physically located on any host in a layer 3 domain. Various tunneling protocols such as VXLAN, GENEVE, etc. are known for implementing the encapsulation decapsulation for logical overlay networks.

VM system 100 includes a diagnostic tool 114 that determines one or more malfunctions in a logical overlay network. Diagnostic tool 114 communicates with agents 116-1, 116-2, 116-3, 116-4 installed on hypervisor 106-1, hypervisor 106-2, hypervisor 106-3, and virtual network controller 124, respectively, to retrieve relevant facts. Although not shown, an agent may be installed on a virtual network manager (e.g., VMware NSX Manager) to retrieve relevant facts. Diagnostic tool 114 may be a standalone component or part of a virtualization manager 115 that centrally provisions and manages virtual and physical objects in VM system 100. Diagnostic tool 114 may be a virtual appliance running on a host coupled by network 116 to hosts 102 and virtual network controller 124.

Figure 2:
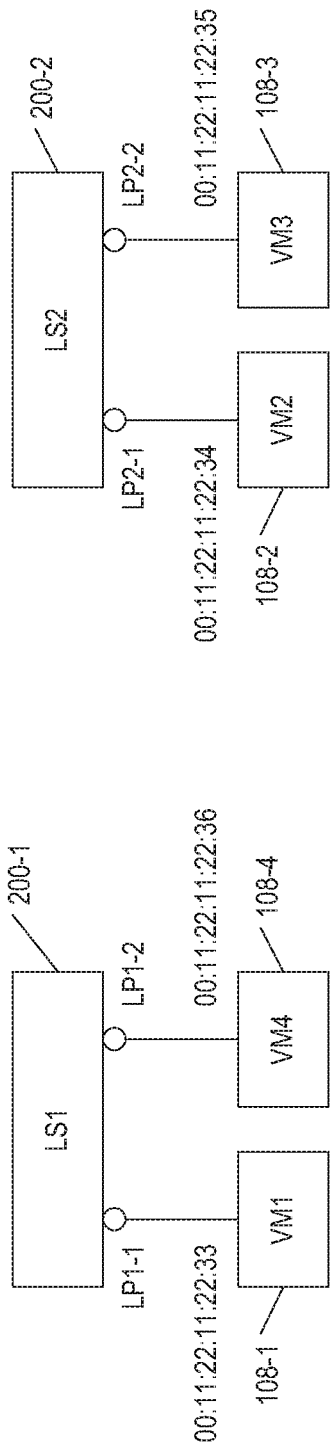
FIG. 2 is a block diagram illustrating a logical view of the VM system of FIG. 1 operating normally in some examples of the present disclosure.

FIG. 2 is a block diagram illustrating a logical view of VM system 100 operating normally in some examples of the present disclosure. VM 108-1 has its VIF 110-1 (FIG. 1) configured with a MAC address of 00:11:22:11:22:33 and bound to a logical port LP1-1 of a logical switch 200-1, which is implemented by forwarding tables 112-2 and 112-3 (FIG. 1) in hypervisors 106-2 and 106-3 (FIG. 1), respectively. VM 108-2 has its VIF 110-2 (FIG. 1) configured with a MAC address of 00:11:22:11:22:34 and bound to a logical port LP2-1 of a logical switch 200-2, which is implemented by forwarding tables 112-1 and 112-2 (FIG. 1) in hypervisors 106-1 and 106-2 (FIG. 1). VM 108-3 has its VIF 110-3 (FIG. 1) configured with a MAC address of 00:11:22:11:22:35 and bound to a logical port LP2-2 of logical switch 200-2. VM 108-4 has its VIF 110-4 (FIG. 1) configured with a MAC address of 00:11:22:11:22:36 and bound to a logical port LP1-2 of logical switch 200-1.

Figure 3:
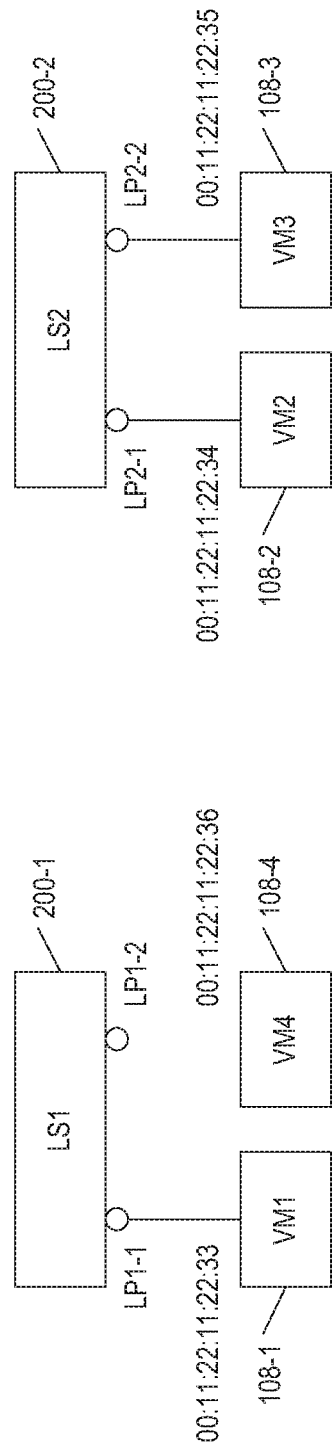
FIG. 3 is a block diagram illustrating a logical view of the VM system of FIG. 1 operating abnormally in some examples of the present disclosure.
Figure 4:
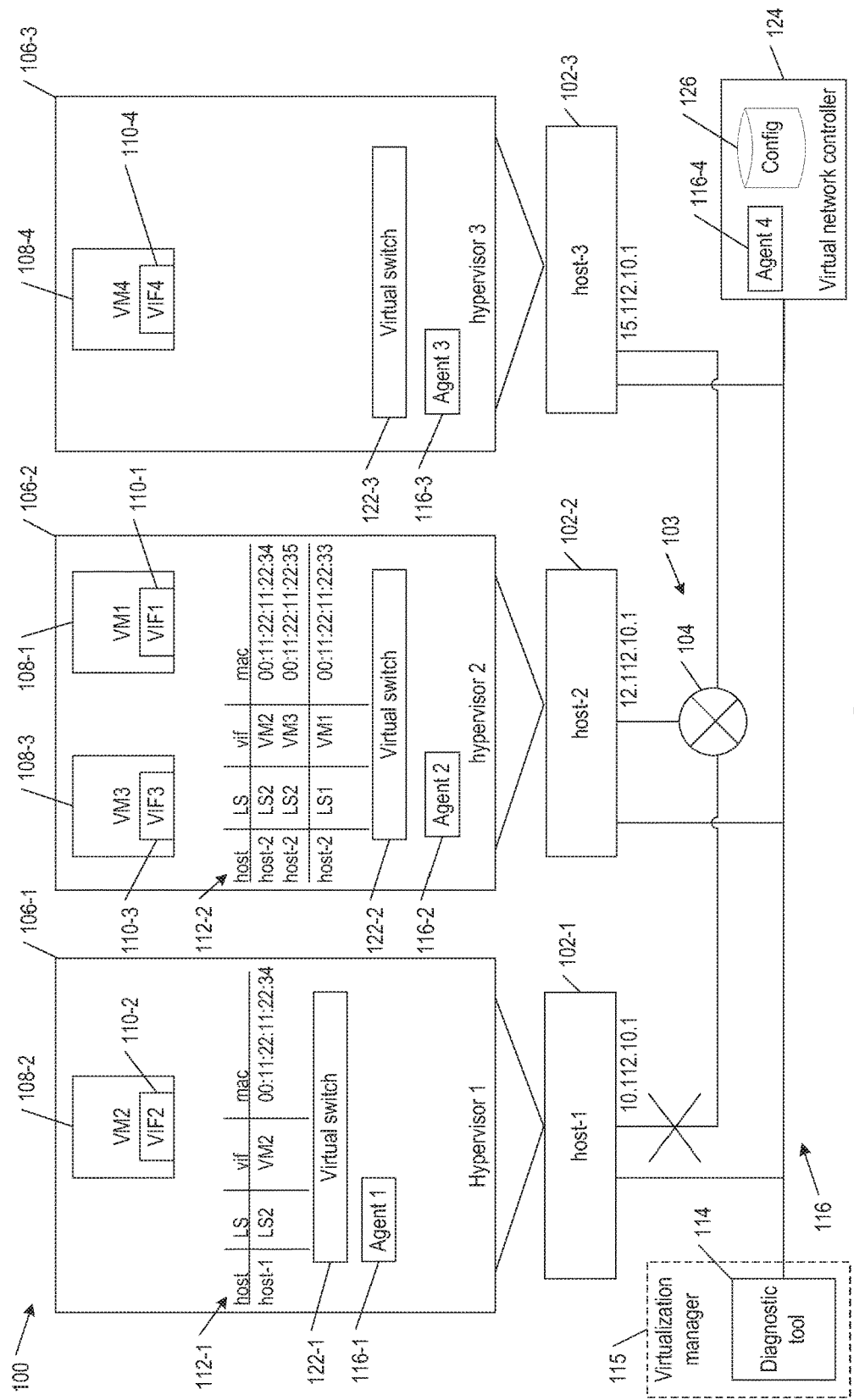
FIG. 4 is a block diagram illustrating a physical view of the VM system of FIG. 1 operating abnormally in some examples of the present disclosure.

To demonstrate diagnostic tool 114 (FIG. 1), assume certain malfunctions have occurred in VM system 100 as shown in FIGS. 3 and 4 in some examples of the present disclosure. FIG. 3 is a block diagram illustrating a logical view of VM system 100 operating abnormally because VIF 110-4 (FIG. 1) of VM 108-4 is not bound to any logical port of a logical switch. FIG. 4 is a block diagram illustrating a physical view of VM system 100 operating abnormally because the physical link between hypervisor 106-1 (hosts 102-1) and switch 104 is broken.

Figure 5:
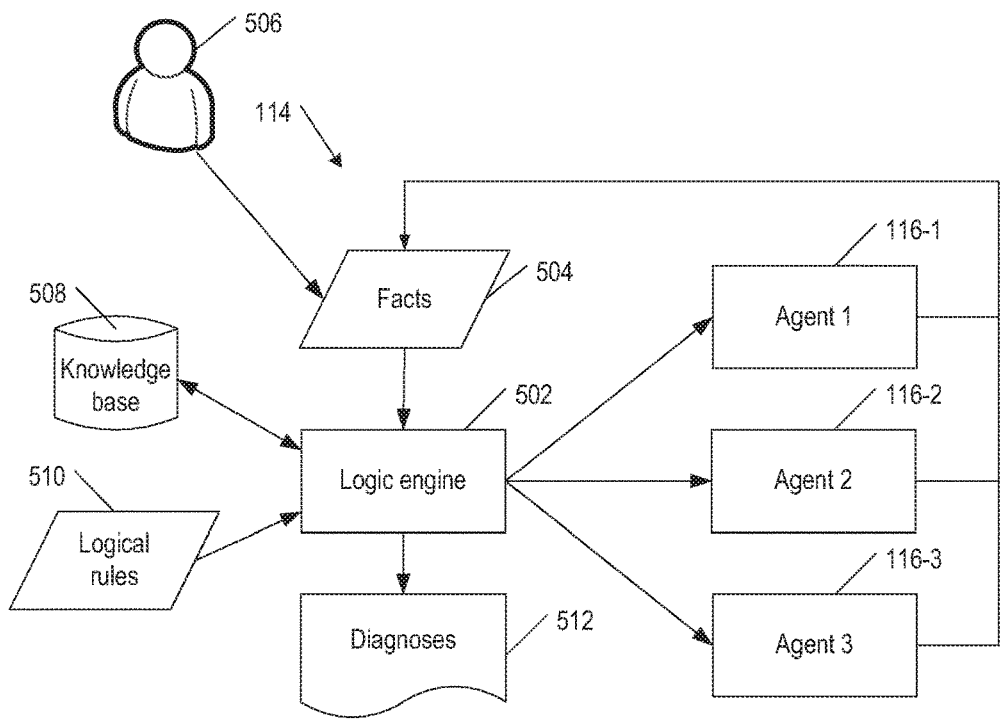
FIG. 5 is a block diagram illustrating a diagnostic tool in the VM system of FIG. 1 in some examples of the present disclosure.

FIG. 5 is a block diagram illustrating diagnostic tool 114 in some examples of the present disclosure. Diagnostic tool 114 includes a logic engine 502 that receives facts 504. When noticing a virtual network is operating abnormally, a user 506 provides observed facts about the virtual network to diagnostic tool 114. The observed facts include symptoms of a malfunction, such as identifiers of virtual components experiencing the malfunction and a symptom type. User 506 expresses the observed facts in terms of the virtual network rather than the internal modeling of the virtual network by the physical system. Logic engine 502 adds the observed facts to a knowledge base 508.

In response to the observed facts, logic engine 502 queries agents 116-1, 116-2, and 116-3 for collected facts related to the virtual components and the symptom type. The collected facts include configuration data of the virtual network and state data of the physical system. Logic engine 502 adds the collected facts to knowledge base 508.

Logic engine 502 uses forward-chaining to apply logic rules 510 repeatedly on knowledge base 508 to produce new facts and add them to knowledge base 508. In response to certain new facts, logic engine 502 may further query agents 116-1, 116-2, and 116-3 for additional collected facts relevant to the certain new facts and add them to knowledge base 508.

Logic engine 502 stops the forward-chaining process when it cannot produce any new facts. The new facts include diagnoses 512 of the virtual network.

Rows (tuples) and tables represent all facts. A table consists of sets of rows (tuples) from the same type. Each table collects a specific type of information from various components in VM system 100.

To simply the process of logical inference, each variable used in the predicate of a logic rule has a universal quantifier, i.e., when x, y, z are variables used in the predicate of rule (x, y, z, . . . ), it means exactly $\forall x \forall y \forall z$ . . . rule (x, y, z, . . . ). Each rule is represented in the form of $\alpha \rightarrow P(x, y, z, \ldots)$, where $\alpha$ is constructed from predicates and functions using logical connectives of conjunction, disjunction, and negation. Negation is only applied to collected facts from agents 116-1, 116-2, and 116-3.

Agents are installed in various components of VM system 100 for collecting configuration data and system state, including hypervisors 106 and virtual network controller 124. The interface to each agent is modeled as tuple query. Each agent exposes a set of query APIs in form of query_agent_x_table_a(field1_value, field2_value, . . . ), which means to get the tuple set from table "a" defined in agent "x" by filtering the provided field value. Wildcard match is supported.

Figure 6:
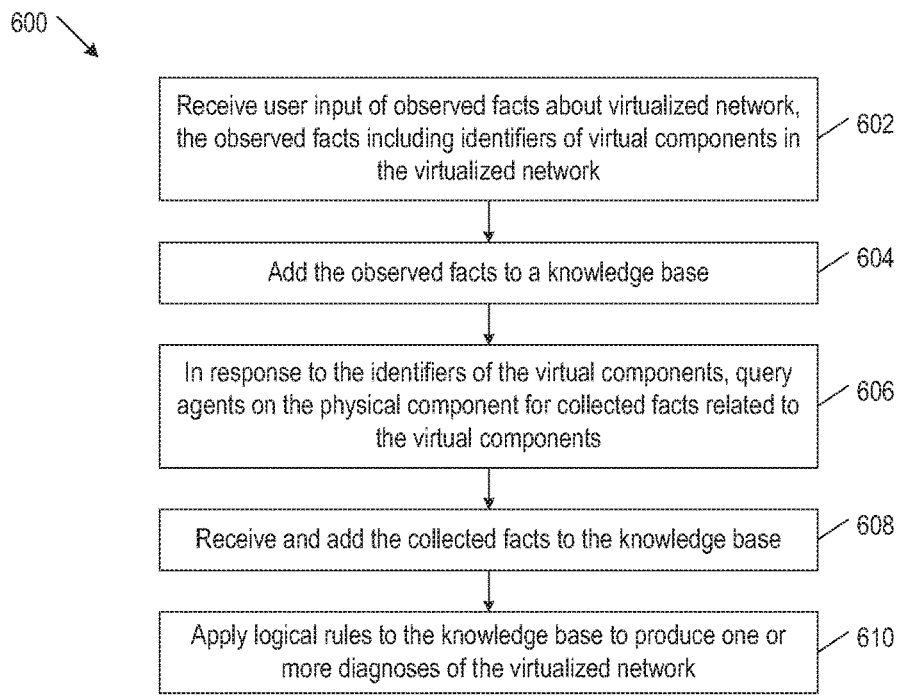
FIG. 6 is a flowchart of a method for the diagnostic tool of FIG. 4 to diagnose one or more malfunctions in a virtual network distributed on physical components in some examples of the present disclosure.

FIG. 6 is a flowchart of a method 600 for diagnostic tool 114 (FIG. 5) to diagnose one or more malfunctions in a virtual network having a network functionality implemented by hypervisors 106 (FIG. 4) in a distributed manner set by a virtual network controller 124 (FIG. 4), each hypervisor performing part of the network functionality, in some examples of the present disclosure. Method 600, and any method described herein, may be implemented as instructions encoded on a computer-readable medium that is to be executed by processors in computers of VM system 100 (FIG. 4). Method 600, and any method described herein, may include one or more operations, functions, or actions illustrated by one or more blocks. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation.

Method 600 may begin in block 602. In block 602, logic engine 502 (FIG. 5) of diagnostic tool 114 receives user input of observed facts about a virtual network. The observed facts include identifiers of virtual components in the virtual network and a symptom type. If logic engine 502 processes only one symptoms type (e.g., ping failure), then the symptom type may be omitted.

To demonstrate method 600, assume a scenario where the user observes a ping failure between VIF 110-1 (VM 108-1) and VIF 110-4 (VM 108-4) on a Layer 2 (L2) logical overlay network, and another ping failure between VIF 110-2 (VM 108-2) and VIF 110-3 (VM 108-3) on another L2 (Ethernet) logical overlay network. The observed facts may be expressed as a table "ping_failed" to logic engine 502 as shown below.

TABLE 1

| ping_failed | |
| --- | --- |
| vif1 | vif2 |
| VM1 | VM4 |
| VM2 | VM3 |

In table "ping_failed," each row (tuple) lists a first VIF (vif1) and a second VIF (vif2) experiencing a ping failure. In this table and others in the present disclosure, each VIF is identified by the name of its VM and VMs 108-1, 108-2, 108-3, and 108-4 are respectively named as VM1, VM2, VM3, and VM4 for convenience. Block 602 may be followed by block 604.

In block 604, logic engine 502 adds the observed facts (e.g., table "ping_failed") to knowledge base 508. Block 604 may be followed by block 606.

In block 606, in response to the observed facts, logic engine 502 queries agents 116-1, 116-2, and 116-3 (FIG. 5) for collected facts related to the observed facts. For example, logic engine 502 queries agents 116-1, 116-2, 116-3, and 116-4 for configuration data and system state data relevant to VIFs VM1, VM2, VM3, and VM4. Logic engine 502 may also query virtualization manager 115 for the relevant configuration and system state data.

Logic engine 502 may query agents 116-4 for the relevant configuration data from a configuration database 126 in virtual network controller (cluster) 120. Alternatively, logic engine 502 may query an agent installed on the virtual network manager for the relevant configuration data. The relevant configuration data may be expressed as a tables "vif_bind_to_port" and "logical_switch_has_port" to logic engine 502 as shown below.

TABLE 2

| vif_bind_to_port | |
| --- | --- |
| vif | port |
| VM1 | LP1-1 |
| VM2 | LP2-1 |
| VM3 | LP2-2 |

In table "vif_bind_to_port," each row (tuple) lists a VIF (vif) and a logical port (port) bound to the VIF. Instead of querying for all the bindings between VIFs and ports, logic engine 502 limits its query to VIFs VM1, VM2, VM3, and VM4 listed in table "ping_failed." Note that no VIF and port binding was returned for VIF VM4.

TABLE 3

| logical_switch_has_port | |
| --- | --- |
| LS | port |
| LS1 | LP1-1 |
| LS2 | LP2-1 |
| LS2 | LP2-2 |

In table "logical_switch_has_port," each row (tuple) lists a logical switch (LS) and a logical port (port) of that logical switch. Instead of querying for all of the pairings between logical switches and logical ports, logic engine 502 limits its query to logical ports LP1-1, LP2-1, and LP2-2 listed in table "vif_bind_to_port."

Logic engine 502 may query agents 116-1, 116-2, and 116-3 for the relevant system data from hypervisors 106-1, 106-2, and 106-3, respectively. Alternatively, logic engine 502 may query agents 116-4 for the relevant system data from virtual network controller (cluster) 124. The relevant system state data may be expressed as a tables "vif_on_host" to logic engine 502 as shown below.

TABLE 4

| vif_on_host | | |
| --- | --- | --- |
| host | vif | mac |
| host-1 | VM2 | 00:11:22:11:22:34 |
| host-2 | VM1 | 00:11:22:11:22:33 |
| host-2 | VM3 | 00:11:22:11:22:35 |
| host-3 | VM4 | 00:11:22:11:22:36 |

In table "vif_bind_to_port," each row (tuple) lists a host, a VIF (vif) active on that host, and a MAC (mac) address bound to the VIF. Instead of querying for all of the associates among hosts, VIFs, and MAC addresses, logic engine 502 limits its query to VIFs VM1, VM2, VM3, and VM4 listed in table "ping_failed."

Block 606 may be followed by block 608.

In block 608, logic engine 502 receives the collected facts and adds them to knowledge base 508. Block 608 may be followed by block 610.

In block 610, logic engine 502 applies logic rules 510 on knowledge base 508, which includes tables "ping_failed," "vif_bind_to_port," "logical_switch_has_port," and "vif_on_host," to produce one or more diagnoses of the virtual network.

Figure 7:
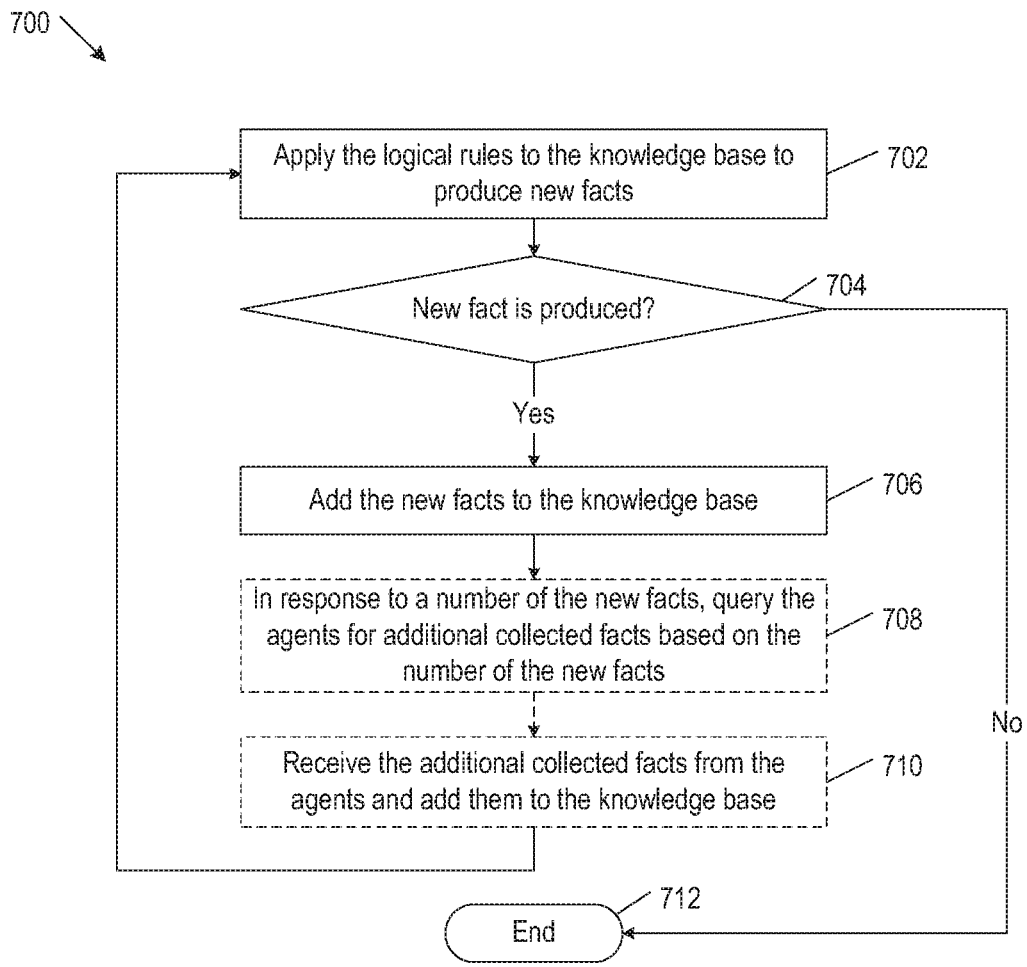
FIG. 7 is a flowchart of a method for implementing a block for applying logic rules to a knowledge base in the method of FIG. 6 in some examples of the present disclosure.

FIG. 7 is a flowchart of a method 700 for implementing block 610 in method 600 in some examples of the present disclosure. Method 700 involves logic engine 502 (FIG. 5)

using forward-chaining to apply logic rules 510 (FIG. 5) repeatedly on knowledge base 508 (FIG. 5) to produce new facts and add them to knowledge base 508 until logic engine 502 cannot produce any new fact. Method 700 may begin in block 702.

In block 702, logic engine 502 applies logic rules 510 to knowledge base 508 to produce one or more new facts. Block 702 may be followed by block 704.

In block 704, logic engine 502 determines if any new fact is produced. If at least one new fact is produced, block 704 is followed by block 706. Otherwise, block 704 is followed by block 712 to end method 700.

In block 706, logic engine 502 adds the new facts to knowledge base 508. Block 706 may be followed by block 708.

In optional block 708, in response to the newly added facts, logic engine 502 may query agents 116-1, 116-2, and 116-3 (or virtualization manager 115) for additional collected facts relevant to the newly added facts. Optional block 708 may be followed by optional block 710.

In optional block 710, logic engine 502 receives the additional collected facts and adds them to knowledge base 708. Optional block 710 loops back to block 702 where logic engine 502 again applies logic rules 510 on knowledge base 508.

Logic rules 510 for diagnosing a L2 virtual network makes certain assumptions, including VM system 100 distributes FIB entries to relevant hypervisors, packets are sent to destination in encapsulated form, and MAC addresses are proactively provisioned to VM system 100. The assumptions are generic and do not rely on implementation details of a specific system. Logic rules 510 are for diagnosing a L2 virtual network may include the following seven (7) rules.

Rule 1: The virtual network has a configuration issue if two VIFs experience a ping failure and one of the VIFs is not connected to a logical switch. Rule 1 may be expressed by the following formula, whose output is a diagnosis.

$$\text{ping\_failed}(vif1,vif2) \land \neg vif\_bind\_to\_ \\ port(vif1,port1) \rightarrow \text{diagnosed\_vif\_not\_bind}(vif1) \quad (1)$$

Rule 2: The virtual network has a configuration issue if two VIFs experience a ping failure and the two VIFs are connected to different logical switch. When level 3 (L3) networking is supported in VM system 100, rule 2 is to be changed to accommodate for Internet Protocol (IP) routing. Rule 2 may be expressed by the following formula, whose output is a diagnosis.

$$\text{ping\_failed}(vif1,vif2) \land vif\_bind\_to\_ \\ port(vif1,port1) \land vif\_bind\_to\_port(vif2,port2) \\ \land \text{logical\_switch\_has\_port}(ls1,port1) \land \text{logical\_switch\_has\_port}(ls2,port2) \\ \land ls1 \neq ls2 \rightarrow \text{diagnosed\_not\_on\_same\_} \\ ls(vif1,vif2) \quad (2)$$

Rule 3: If a VIF is active on a hypervisor, configured with a MAC address, and bound to a logical port of a logical switch, there should be one L2 forwarding information base (FIB) entry specifying the relationship of the logical switch, the hypervisor, the VIF, and the MAC address. Rule 3 stems from the principles of Ethernet packet forwarding. Rule 3 may be expressed by the following formula, whose output is a table "expected_fib_entry."

$$\text{vif\_on\_host}(host,vif,mac) \land vif\_bind\_to\_port(vif,port) \\ \land \text{logical\_switch\_has\_port}(ls,port) \rightarrow \text{expected\_} \\ fib\_entry(ls,host,vif,mac) \quad (3)$$

Rule 4: When there are multiple L2 FIB entries in a logical switch, all the entries must appear on all hypervisors (hosts) where those VIFs appear. In other words, rule 4 determines expected FIB entries on each of the hosts by generating an expected FIB entry on that host for each of the VIFs that is active on another host and bound to a logical port of a logical switch that is present on the host. Rule 4 stems from distributing FIB entries for L2 virtual networking. Rule 4 may be expressed by the following formula, whose output is a table "expected_fib_on_host."

$$\text{expected\_fib\_entry}(ls1,host1,vif1,mac1) \land \\ \text{expected\_fib\_entry}(ls2,host2,vif2,mac2) \\ \land ls1=ls2 \rightarrow \text{expected\_fib\_on\_} \\ host(host1,ls2,vif2,mac2) \quad (4)$$

Rule 5: The virtual network has a system defect if an expected L2 FIB entry known from rule 4 does not appear on a hypervisor (host). In other words, rule 5 diagnoses a system defect when an expected FIB entry on a host does not match any of the actual FIB entries on that host. Rule 5 may be expressed by the following formula, whose output is a diagnosis of a system defect.

$$\text{expected\_fib\_on\_host}(host,ls,vif,mac) \land \neg \\ \text{realized\_fib\_host}(host,ls,vif,mac) \rightarrow \\ \text{diagnosed\_fib\_error}(host,ls,vif,mac) \quad (5)$$

For rule 5, logic engine 502 queries agents 16-1, 116-2, and 116-3 (or virtualization manager 115) for the actual FIB entries in forwarding tables of hosts listed in table "expected_fib_on_host." The actual FIB entries in the forwarding tables of these hosts are presented in a table "realized_fib_host."

Rule 6: For each L2 FIB entry on a hypervisor (host) known from rule 4, the IP address of its tunnel endpoint should be known to that hypervisor. In other words, rule 6 determines expected host tunnels between a host and other hosts for each L2 FIB entry on the host. Rule 6 may be expressed by the following formula, whose output is a table "expected_host_tunnel."

$$\text{expected\_fib\_on\_host}(host1,ls2,vif2,mac2) \land \\ vif\_on\_host(host2,vif2,mac2) \land host\_ \\ tunnel(host2,ip2) \rightarrow \text{expected\_host\_tunnel}(host1, \\ host2,vif2,ip2) \quad (6)$$

For rule 6, logic engine 502 queries agents 16-1, 116-2, and 116-3 (or virtualization manager 115) for IP addresses of hosts listed in table "vif_on_host," and the host and IP address associations are presented in a table "host_tunnel."

Rule 7: The virtual network has a physical connectivity issue between 2 hypervisors if two VIFs experience a ping failure and logical packets must go through this link (tunnel). In other words, rule 7 diagnoses a tunnel issue when an expected host tunnel does not match any functioning tunnel. Rule 7 may be expressed by the following formula, whose output is a diagnosis of a tunnel issue.

$$\text{expected\_host\_tunnel}(host1,host1,vif1,ip1) \land \\ \text{expected\_host\_tunnel}(host1,host2,vif2,ip2) \\ \land \neg bfd\_link\_ok(ip1,ip2) \land \text{ping\_} \\ failed(vif1,vif2) \rightarrow \text{diagnosed\_tunnel\_} \\ issue(host1,host2) \quad (7)$$

For rule 7, logic engine 502 queries agents 16-1, 116-2, and 116-3 (or virtualization manager 115) for the associations of two IP addresses of functioning tunnels, which are presented in a table "bfd_link_ok."

The application of the seven (7) logic rules 510 in method 700 is demonstrated with the previously introduced scenario where the user observes a ping failure between VIFs VM1 and VM4, and another ping failure between VIFs VM2 and VM3. In a first pass through method 700 with tables "ping_failed," "vif_bind_to_port," "logical_switch_ has_port," and "vif_on_host" in knowledge base 508, logic engine 502 is able to apply rules 1, 2, and 3 on knowledge bae 508.

Applying rule 1 to the first row in table "ping_failed," logic engine 502 determines a diagnosis that VM4 is not bound to a logical port.

ping_failed(VM1,VM4)∧¬vif_bind_to_
  port(VM4,_)_diagnosed_vif_not_bind(VM4).

TABLE 5

| diagnosed_vif_not_bind |
|---|
| vif |
| VM4 |

Applying rule 2 to each row in table "ping_failed," logic engine 502 did not find any row that meets the conditions for the diagnosis of rule 2.

Applying rule 3 to tables "vif_on_host," "vif_bind_to_port," and "logical_switch_has_port," logic engine 502 determines rows for table "expected_fib_entry" as follows (for simplicity the MAC addresses are left out). Note that VM4 on host-3 cannot meet the conditions of rule 3 so it does not have any corresponding entry in table "expected_fib_entry."

vif_on_host(host-1,VM2,mac)∧vif_bind_to_port
  (VM2,LP2-1)∧logical_switch_has_port(LS2,
  LP2-1)→expected_fib_entry(LS2,host-1,VM2,
  mac)

vif_on_host(host-2,VM1,mac)∧vif_bind_to_port
  (VM1,LP1-1)∧logical_switch_has_port(LS1,
  LP1-1)→expected_fib_entry(LS1,host-2,VM1,
  mac)

vif_on_host(host-2,VM3,mac)∧vif_bind_to_port
  (VM3,LP2-2)∧logical_switch_has_port(LS2,
  LP2-2)→expected_fib_entry(LS2,host-2,VM3,
  mac)

TABLE 6

| expected_fib_entry ||||
|---|---|---|---|
| LS | host | vif | mac |
| LS2 | host-1 | VM2 | 00:11:22:11:22:34 |
| LS1 | host-2 | VM1 | 00:11:22:11:22:33 |
| LS2 | host-2 | VM3 | 00:11:22:11:22:35 |

The output of rule 3 is forward-chained as input to rule 4. Applying rule 4 to table "expected_fib_entry," logic engine 502 determines rows for table "expected_fib_on_host" (for simplicity the MAC addresses are left out). Table "expected_fib_on_host" is obtained by applying rule 4 on all combinations of tuples from table "expected_fib_entry." Rule 4 uses indices 1 and 2 to indicate a comparison of two tuples from table "expected_fib_entry" but rule 4 also compares a tuple to itself. Note that row 2 in combination with row 1 or row 3 of table "expected_fib_entry" cannot meet the conditions of rule 4 so they do not have any corresponding entry in table "expected_fib_on_host."

expected_fib_entry(LS2,host-1,VM2,mac2)∧expect-
  ed_fib_entry(LS2,host-1,VM2,mac2)
  ∧LS2=LS2→expected_fib_on_host(host-1,LS2,
  VM2,mac2)

expected_fib_entry(LS2,host-1,VM2,mac1)∧expect-
  ed_fib_entry(LS2,host-2,VM3,mac2)
  ∧LS2=LS2→expected_fib_on_host(host-1,LS2,
  VM3,mac2)

expected_fib_entry(LS1,host-2,VM1,mac1)∧expect-
  ed_fib_entry(LS1,host-2,VM1,mac1)
  ∧LS1=LS1→expected_fib_on_host(host-2,LS1,
  VM1,mac1)

expected_fib_entry(LS2,host-2,VM3,mac1)∧expect-
  ed_fib_entry(LS2,host-1,VM2,mac2)
  ∧LS2=LS2→expected_fib_on_host(host-2,LS2,
  VM2,mac2)

expected_fib_entry(LS2,host-2,VM3,mac3)∧expect-
  ed_fib_entry(LS2,host-2,VM3,mac3)
  ∧LS2=LS2→expected_fib_on_host(host-2,LS2,
  VM3,mac3)

TABLE 7

| expected_fib_on_host ||||
|---|---|---|---|
| host | LS | vif | mac |
| host-1 | LS2 | VM2 | 00:11:22:11:22:34 |
| host-1 | LS2 | VM3 | 00:11:22:11:22:35 |
| host-2 | LS1 | VM1 | 00:11:22:11:22:33 |
| host-2 | LS2 | VM2 | 00:11:22:11:22:34 |
| host-2 | LS2 | VM3 | 00:11:22:11:22:35 |

The output of rule 4 is forward-chained as input to rule 5. For rule 5, logic engine 502 queries agents 116-1, 116-2, and 116-3 (or virtualization manager 115) for the actual FIB entries on host-1 and host-2 listed in table "expected_fib_on_host." Agents 116-1 and 116-2 gather the FIB entries on hosts-1 and host-2 from forwarding tables 112-1 and 112-2 (FIG. 1) and returns them to logic engine 502. The actual FIB entries on host-1 and host-2 are presented in a table "realized_fib_host."

TABLE 8

| realized_fib_host ||||
|---|---|---|---|
| host | LS | vif | mac |
| host-1 | LS2 | VM2 | 00:11:22:11:22:34 |
| host-2 | LS1 | VM1 | 00:11:22:11:22:33 |
| host-2 | LS2 | VM2 | 00:11:22:11:22:34 |
| host-2 | LS2 | VM3 | 00:11:22:11:22:35 |

Applying rule 5 to tables "expected_fib_on_host" and "realized_fib_host," logic engine 502 determines a diagnosis that host-1 is missing a FIB entry for VIF VM3 connected to logical switch LS2 as follows (for simplicity the MAC addresses are left out). Note that row 2 in table "expected_fib_on_host" meets the conditions of rule 5 so logic engine 502 determines VIF VM3 in that row is missing a corresponding FIB entry on host-1.

expected_fib_on_host(host-1,LS2,VM3,mac)∧¬real-
  ized_fib_host(host-1,LS2,VM3,mac)→diag-
  nosed_fib_error(host-1,LS2,VM3,mac)

TABLE 9

| diagnosed_fib_error | | | |
|---|---|---|---|
| host | LS | vif | mac |
| host-1 | LS2 | VM3 | 00:11:22:11:22:35 |

The output of rule 4 is also forward-chained as input to rule 6. For rule 6, logic engine 502 queries agents 116-1, 116-2, and 116-3 (or virtualization manager 115) for addresses of host-1, host-2, and host-3 listed in table "vif_on_host." The addresses of host-1, host-2, and host-3 are presented in a table "host_tunnel."

TABLE 10

| host_tunnel | |
|---|---|
| host | IP |
| host-1 | 10.112.10.1 |
| host-2 | 12.112.10.1 |
| host-3 | 15.112.10.1 |

Applying rule 6 to tables "expected_fib_on_host," "vif_on_host," and "host_tunnel," logic engine 502 determines rows for table "expected_host_tunnel" as follows (for simplicity the IP addresses are left out).

expected_fib_on_host(host-1,LS2,VM2,mac2)∧vif_on_host(host-1,VM2,mac2)∧host_tunnel(host-1,ip1)→expected_host_tunnel(host-1,host-1,VM2,ip1)

expected_fib_on_host(host-1,LS2,VM3,mac3)∧vif_on_host(host-2,VM3,mac3)∧host_tunnel(host-2,ip2)→expected_host_tunnel(host-1,host-2,VM3,ip2)

expected_fib_on_host(host-2,LS1,VM1,mac1)∧vif_on_host(host-2,VM1,mac1)∧host_tunnel(host-2,ip2)→expected_host_tunnel(host-2,host-2,VM1,ip2)

expected_fib_on_host(host-2,LS2,VM2,mac2)∧vif_on_host(host-1,VM2,mac2)∧host_tunnel(host-1,ip1)→expected_host_tunnel(host-2,host-1,VM2,ip1)

expected_fib_on_host(host-2,LS2,VM3,mac3)∧vif_on_host(host-2,VM3,mac3)∧host_tunnel(host-2,ip2)→expected_host_tunnel(host-2,host-2,VM3,ip2)

TABLE 11

| expected_host_tunnel | | | |
|---|---|---|---|
| host1 | host2 | vif | tunnel_ip |
| host-1 | host-1 | VM2 | 10.112.10.1 |
| host-1 | host-2 | VM3 | 12.112.10.1 |
| host-2 | host-2 | VM1 | 12.112.10.1 |
| host-2 | host-1 | VM2 | 10.112.10.1 |
| host-2 | host-2 | VM3 | 12.112.10.1 |

The output of rule 6 is forward-chained as input to rule 7. For rule 7, logic engine 502 queries agents 116-1, 116-2, and 116-3 (or virtualization manager 115) for functioning tunnels between host-1, host-2, and host-3 listed in table "bfd_link_ok." Agents 116-1, 116-2, and 116-3 (or virtualization manager 115) may run bidirectional forward detection (BFD) between each pair of hosts to determine if a tunnel between them is operating properly. The functioning tunnels are presented in a table "bfd_link_ok." As table "bfd_link_ok" indicates, there is a functioning tunnel between host-2 and host-3 but not between host-1 and host-2.

TABLE 12

| bfd_link_ok | |
|---|---|
| IP1 | IP2 |
| 12.112.10.1 | 15.112.10.1 |

Applying rule 7 to tables "expected_host_tunnel" and "bfd_link_ok," logic engine 502 determines a diagnosis that a tunnel is not functioning between host-1 and host-2. Note that rows 1 and 2 in table "expected_host_tunnel" meet the conditions of rule 7 so logic engine 502 determines there is a tunnel issue between host-1 and host-2.

expected_host_tunnel(host-1,host-1,VM2,ip1)∧expected_host_tunnel(host-1,host-2,VM3,ip2)∧¬bfd_link_ok(ip1,ip2)∧ping_failed(VM2,VM3)→diagnosed_tunnel_issue(host-1,host-2)

TABLE 13

| diagnosed_tunnel_issue | |
|---|---|
| host1 | host2 |
| host-1 | host-2 |

While logic rules for diagnosing a L2 virtual network is disclosed, logic rules for diagnosing other network functionalities, such as L3 routing, distributed firewall, etc., can be constructed in the same way.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to diagnose one or more malfunctions in a virtual network having a network functionality implemented by hypervisors in a distributed manner set by a virtual network controller, each hypervisor performing part of the network functionality, the method comprising:
   receiving, by a diagnostic tool, user input of observed facts about the virtual network, the observed facts including identifiers of virtual components in the virtual network;
   adding, by the diagnostic tool, the observed facts to a knowledge base;
   in response to the identifiers of the virtual components, querying, by the diagnostic tool, agents on the hypervisors and the virtual network controller for collected facts related to the virtual components;
   receiving and adding, by the diagnostic tool, the collected facts to the knowledge base; and
   applying, by the diagnostic tool, logic rules to the knowledge base to produce one or more diagnoses of the virtual network.

2. The method of claim 1, wherein said applying logic rules includes performing forward-chaining, which includes:
applying the logic rules to the knowledge base to produce new facts;
adding the new facts to the knowledge base; and
repeating said applying the logic rules to the knowledge base to produce new facts and said adding the new facts to the knowledge base until no new fact is produced.

3. The method of claim 2, wherein said performing forward-chaining further comprises:
in response to a number of the new facts, querying the agents for additional collected facts based on the number of the new facts; and
receiving the additional collected facts from the agents and adding the additional collected facts to the knowledge base.

4. The method of claim 1, wherein the observed facts comprises an identifier of a ping failure and the identifiers of virtual network interfaces experiencing the ping failure.

5. The method of claim 4, wherein:
the collected facts include configuration data and system state related to the virtual network interfaces;
the configuration data include associations of a number of the virtual network interfaces that are bound to logical ports, the logical ports, and logical switches with the logical ports; and
the system state includes associations between another number of the virtual network interfaces that are active on host computers, the host computers, and MAC addresses assigned to the active virtual network interfaces.

6. The method of claim 5, wherein the logic rules include a rule determining a configuration error when two of the virtual network interfaces experience the ping failure and one of the two virtual network interfaces is not bound to a logical port.

7. The method of claim 5, wherein the logic rules include a rule determining a configuration error when two of the virtual network interfaces experience the ping failure and the two virtual network interfaces are connected to different logical switches.

8. The method of claim 5, wherein:
the logic rules include a first rule determining expected forwarding information base (FIB) entries by generating a FIB entry for each of the virtual network interfaces that is active on a host computer, configured with a MAC address, and bound to a logical port of a logical switch; and
adding the expected FIB entries to the knowledge base.

9. The method of claim 8, wherein:
the logic rules include a second rule determining expected FIB entries on each of the host computers by generating an expected FIB entry on that host computer for each of the virtual network interfaces that is active on another host computer and bound to a logical port of a logical switch that is present on the host computer; and
adding the expected FIB entries on the host computers to the knowledge base.

10. The method of claim 9, further comprising:
querying the agents for actual FIB entries on the host computers; and
adding the actual FIB entries on the host computers to the knowledge base,
wherein the logic rules include a third rule determining a system defect when an expected FIB entry on a host computer does not match any of the actual FIB entries on that host computer.

11. The method of claim 9, further comprising:
querying the agents for addresses of tunnel endpoints at the host computers; and
adding the addresses of the tunnel endpoints at the host computers to the knowledge base,
wherein the logic rules include a third rule determining expected host tunnels between pairs of the host computers.

12. The method of claim 11, further comprising:
querying the agents for one or more functioning host tunnels between pairs of the tunnel endpoints; and
adding the one or more functioning tunnels to the knowledge base,
wherein the logic rules comprise a fourth rule determining a tunnel issue when an expected host tunnel does not match any of the one or more functioning tunnels.

13. A non-transitory, computer-readable storage medium encoded with instructions executable by a processor to diagnose one or more malfunctions in a virtual network having a network functionality implemented by hypervisors in a distributed manner set by a virtual network controller, each hypervisor performing part of the network functionality, the instructions comprising:
receiving user input of observed facts about the virtual network, the observed facts including identifiers of virtual components in the virtual network;
adding the observed facts to a knowledge base;
in response to the identifiers of the virtual components, querying agents on the hypervisors and the virtual network controller for collected facts related to the virtual components;
receiving and adding the collected facts to the knowledge base; and
applying logic rules to the knowledge base to produce one or more diagnoses of the virtual network.

14. The storage medium of claim 13, wherein said applying logic rules to the knowledge base to produce one or more diagnoses of the virtual network includes performing forward-chaining, which includes:
applying the logic rules to the knowledge base to produce new facts;
adding the new facts to the knowledge base;
in response to a number of the new facts, querying the agents for additional collected facts based on the number of the new facts;
receiving the additional collected facts from the agents and adding the additional collected facts to the knowledge base; and
repeating said applying, said adding the new facts, said querying, said receiving and adding the additional collected facts until no new fact is produced.

15. The storage medium of claim 13, wherein:
the observed facts comprise an identifier of a ping failure and the identifiers of virtual network interfaces experiencing the ping failure;
the collected facts include configuration data and system state related to the virtual network interfaces;
the configuration data include associations of a number of the virtual network interfaces that are bound to logical ports, the logical ports, and logical switches with the logical ports; and
the system state includes associations of another number of the virtual network interfaces that are active on host computers, the host computers, and MAC addresses assigned to the active virtual network interfaces.

16. The storage medium of claim 15, wherein the logic rules include a rule determining a configuration error when two of the virtual network interfaces experience the ping failure and one of the two virtual network interfaces is not bound to a logical port.

17. The storage medium of claim 15, wherein the logic rules include a rule determining a configuration error when two of the virtual network interfaces experience the ping failure and the two virtual network interfaces are connected to different logical switches.

18. The storage medium of claim 15, wherein:
the logic rules include:
   a first rule determining expected forwarding information base (FIB) entries by generating a FIB entry for each of the virtual network interfaces that is active on a host computer, configured with a MAC address, and bound to a logical port of a logical switch;
   a second rule determining expected FIB entries on each of the host computers by generating an expected FIB entry on that host computer for each of the virtual network interfaces that is active on another host computer and bound to a logical port of a logical switch that is present on the host computer; and
   a third rule determining a system defect when an expected FIB entry on a host computer does not match any of the actual FIB entries on that host computers; and
the method further includes:
   adding the expected FIB entries to the knowledge base;
   adding the expected FIB entries on the host computers to the knowledge base;
   querying the agents for actual FIB entries on the host computers; and
   adding the actual FIB entries on the host computers to the knowledge base.

19. The storage medium of claim 18, wherein:
the logic rules include a fourth rule determining expected forwarding information base (FIB) entries by generating a FIB entry for each of the virtual network interfaces that is active on a host computer, configured with a MAC address, and bound to a logical port of a logical switch;
the method further includes adding the expected FIB entries to the knowledge base;
the logic rules include a fifth rule determining expected FIB entries on the host computers by generating, for each of the host computers, an expected FIB entry on that host computer for each of the virtual network interfaces that is active on another host computer and bound to a logical port of a logical switch that is present on the host computer;
the method further includes:
   adding the expected FIB entries on the host computers to the knowledge base;
   querying the agents for addresses of tunnel endpoints at the host computers; and
   adding the addresses of the tunnel endpoints at the host computers to the knowledge base;
the logic rules include a sixth rule determining expected host tunnels between pairs of the host computers;
the method further includes:
   querying the agents for one or more functioning host tunnels between pairs of the tunnel endpoints; and
   adding the one or more functioning tunnels to the knowledge base; and
the logic rules include a seventh rule determining a tunnel issue when an expected host tunnel does not match any of the one or more functioning host tunnels.

20. A system, comprising:
physical host computers;
hypervisors on the physical host computers;
a virtual network controller setting a distributed manner by which the hypervisors implement a network functionality, each hypervisor performing part of the network functionality;
agents on the hypervisors and the virtual network controller;
a diagnostic tool comprising a logic engine configured to:
   receive user input of observed facts about the virtual network, the observed facts including identifiers of virtual components in the virtual networking system;
   add the observed facts to a knowledge base;
   in response to the identifiers of the virtual components, query the agents for collected facts related to the virtual components;
   receiving and adding the collected facts to the knowledge base; and
   applying logic rules to the knowledge base to produce one or more diagnoses of the virtual network.

* * * * *